United States Patent
Jagannathan et al.

(10) Patent No.: US 9,098,827 B2
(45) Date of Patent: Aug. 4, 2015

(54) INTERACTIVE QUERY TOOL

(75) Inventors: Srivatsan Jagannathan, Charlotte, NC (US); Ravibabu Poruri, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 1003 days.

(21) Appl. No.: 12/648,841

(22) Filed: Dec. 29, 2009

(65) Prior Publication Data

US 2011/0161431 A1 Jun. 30, 2011

(51) Int. Cl.
| | |
|---|---|
| *G06Q 10/10* | (2012.01) |
| *H04L 12/58* | (2006.01) |
| *H04N 21/4788* | (2011.01) |
| *G06F 17/30* | (2006.01) |

(52) U.S. Cl.
CPC ............... *G06Q 10/10* (2013.01); *G06F 17/30* (2013.01); *G06F 17/30864* (2013.01); *H04L 12/581* (2013.01); *H04L 51/04* (2013.01); *H04L 51/18* (2013.01); *H04N 21/4788* (2013.01)

(58) Field of Classification Search
CPC ... G06F 17/30864; G06F 17/30; H04L 51/04; H04L 12/581; H04L 51/18; H04N 21/4788
USPC ......................................................... 709/206
See application file for complete search history.

(56) References Cited

U.S. PATENT DOCUMENTS

| | | | |
|---|---|---|---|
| 6,425,012 B1 * | 7/2002 | Trovato et al. ................ 709/227 |
| 6,430,602 B1 | 8/2002 | Kay et al. | |
| 6,519,628 B1 * | 2/2003 | Locascio ....................... 709/204 |
| 6,539,421 B1 * | 3/2003 | Appelman et al. ............ 709/206 |
| 6,829,348 B1 * | 12/2004 | Schroeder et al. ........ 379/265.09 |
| 6,922,689 B2 * | 7/2005 | Shtivelman ........................... 1/1 |
| 7,454,469 B2 * | 11/2008 | Zhou et al. .................... 709/206 |
| 7,685,237 B1 * | 3/2010 | Weaver et al. ................ 709/205 |
| 7,685,246 B2 * | 3/2010 | Lingafelt et al. ............. 709/206 |
| 7,870,264 B2 * | 1/2011 | Clark et al. ................... 709/227 |
| 8,037,147 B1 * | 10/2011 | Herold et al. ................. 709/206 |
| 8,244,807 B2 * | 8/2012 | Malik ........................... 709/204 |
| 2001/0053977 A1 * | 12/2001 | Schaefer .................... 704/270.1 |
| 2003/0182391 A1 * | 9/2003 | Leber et al. .................. 709/217 |
| 2005/0080868 A1 * | 4/2005 | Malik ........................... 709/207 |
| 2005/0198149 A1 * | 9/2005 | Johnson et al. .............. 709/206 |
| 2006/0080130 A1 * | 4/2006 | Choksi ............................. 705/1 |

(Continued)

OTHER PUBLICATIONS

Merriam-Webster, Apparatus, pp. 1-3.*

*Primary Examiner* — Backhean Tiv
(74) *Attorney, Agent, or Firm* — Banner & Witcoff, Ltd.; Michael A. Springs (57) ABSTRACT

A chat room system interfaces with an automated processing system. When an interactive query message from a user is addressed to the automated processing system, the interactive query message is passed to the automated processing system. The automated processing system extracts one or more keywords from the interactive query message and obtains response information from a data structure based on the one or more keywords. The automated processing system then returns an interactive response to the user through instant messaging. When the interactive query message is not addressed to the automated processing system, the interactive query message is forwarded to a support group through a chat room system. When the interactive response exceeds a predetermined size, part of the interactive response may be sent through instant messaging and the remainder through e-mail.

13 Claims, 6 Drawing Sheets

(56) References Cited

U.S. PATENT DOCUMENTS

| | | | |
|---|---|---|---|
| 2006/0095561 A1* | 5/2006 | Childress et al. | 709/224 |
| 2006/0136474 A1* | 6/2006 | Chang et al. | 707/102 |
| 2006/0271953 A1* | 11/2006 | Jacoby et al. | 725/34 |
| 2007/0043823 A1* | 2/2007 | George et al. | 709/207 |
| 2007/0136400 A1* | 6/2007 | Ames et al. | 707/205 |
| 2008/0228890 A1* | 9/2008 | George et al. | 709/206 |
| 2008/0307062 A1* | 12/2008 | Wang | 709/206 |
| 2009/0055497 A1* | 2/2009 | Dickerson et al. | 709/207 |
| 2009/0083380 A1* | 3/2009 | Smyth et al. | 709/206 |
| 2011/0029898 A1* | 2/2011 | Malik | 715/758 |

* cited by examiner

| | | |
|---|---|---|
| User: | xxxxx | oli Hi |
| Robot | 401 403 | Hey xxxxx 405 |
| User: | xxxxx | oli help 404 |
| Robot | 402 | Here is a list of possible commands : [accountstats|backupoli|bm|clientson|die|extractxml|fidessastats|fxallrfqcredit|groupstats|helloworld|manual|orderstats|perms|prefs|task|time|tradestats|updateoli|userstats|ver|whatsmaster|whatwhere]. |
| Robot | | User ( xxxxx ) perms: [accountstats|die|fidessastats|fxallrfqcredit|groupstats|helloworld|manual|orderstats|prefs|task|updateoli|userstats|ver|whatsmaster|whatwhere]. For more information say 'oli info <command>' |
| User: | xxxxx | oli sit |
| Robot | | xxxxx I AM NOT YOUR PET! |
| User: | xxxxx | oli userstats |
| Robot | | Search string must be at least 3 letters. Usage : 'userstats seachstring' |
| User: | xxxxx | oli userstats xxxxx 406 |
| Robot | | xxxxx : xxxxx 407 |
| Robot | | Name : Company Internal Group |
| Robot | | ID : 1 |
| Robot | | Tier : SpotTierName : Sales Tier - Internal Only , TierID : 8 |
| Robot | | Tier : FwdTierName : Sales Tier - Internal Only , TierID : 8 |
| Robot | | -- Users -- |
| Robot | | UserName : xxxxxxx , FullName : xxxxxxxxx |
| Robot | | UserName : xxxxxxx , FullName : xxxxxxxxx |
| Robot | | Emailing the rest to user_name@company.com because: This returned more than 10 lines, so I truncated. For email of large output, use 'oli prefs email your_name@ml.com' to set/change your email address |
| User: | xxxxx | oli die |
| Robot | | I must kill myself now but the monitor will bring me back to life. Farewell xxxxx |
| Robot | | 25725 /bin/bash /panther/apps/panther.phase-5.1_20090325/sh/Bot.sh --background=yes |
| User: | xxxxx | oli Thanks |
| Robot | | No worries xxxxx |

INTERACTIVE QUERY TOOL

FIELD

Aspects of the embodiments generally relate to an automated solution for employees submitting business-related queries and receiving responses in an interactive environment.

BACKGROUND

Many businesses depend on internal support groups to provide assistance to employees in numerous disciplines including finance, transport, information technology (IT), and human resources. According to traditional systems, support groups may utilize different approaches such as help desks in which an employee can call into a designated number in order to obtain assistance from a member of a support team. Businesses are also incorporating group chat solutions that may combine the asynchronous aspects of email and real-time aspects of instant messaging to make it easier to conduct ongoing, cross-functional team discussions about business-critical topics between a support group member and other employees.

As a result, support groups assist businesses to broaden information awareness, reduce information overload, reduce interruptions, securely connect teams to external communities, and enhance and retain organizational knowledge. For example, an international bank with operations throughout the world may need a support tool to facilitate text-based communication throughout its global financial markets network. Conventional instant messaging may not provide the security and archiving capabilities required by the U.S. Securities and Exchange Commission (SEC). As an alternative approach, the international bank may utilize a persistent chat solution in which chat communications channels keep traders up-to-date. The channels are typically similar to chat rooms that are organized around products, such as credit, foreign exchange, emerging markets, or government bonds. Topic-based, persistent group channels may allow distributed, virtual teams to maintain an ongoing dialogue about business-critical topics as well as to broaden information awareness.

However, an employee may experience a hectic environment during a business day with a lot of things on the employee's computer display that may span multiple chat channels, thus often resulting in multitasking for the employee.

BRIEF SUMMARY

Aspects of the embodiments address one or more of the issues mentioned above by disclosing methods, computer readable media, and apparatuses in which a chat room system interfaces with an automated processing system. When an interactive query message from a user is addressed to the automated processing system, the interactive query message is passed to the automated processing system. The automated processing system extracts one or more keywords from the interactive query message and obtains response information from a data structure based on the one or more keywords. The automated processing system then returns an interactive response to the user through instant messaging. When the interactive query message is not addressed to the automated processing system, the interactive query message is forwarded to a support group through a chat room system. When the interactive response exceeds a predetermined size, part of the interactive response may be sent through instant messaging and the remainder through e-mail.

With another aspect of the embodiments, an interactive query message is received from a user. When the interactive query message is addressed to an automated processing system, the message is passed to an automated processing system that extracts at least one keyword from the interactive query message, obtains response information from a data structure based on the at least one keyword, and returns an interactive response to the user. However, when the interactive query message is not addressed to the automated processing system, it is forwarded to a support group through the chat room system.

With another aspect of the embodiments, the automated processing system may support commands including user statistics, trade statistics, user permissions for the user, and user group and account information.

Aspects of the embodiments may be provided in a computer-readable medium having computer-executable instructions to perform one or more of the process steps described herein.

These and other aspects of the embodiments are discussed in greater detail throughout this disclosure, including the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION

In accordance with various aspects of the embodiments, methods, computer-readable media, and apparatuses are disclosed in which a chat room system interfaces with an automated processing system. When an interactive query message from a user is addressed to the automated processing system, the interactive query message is passed to the automated processing system. The automated processing system extracts at least one keyword from the interactive query message and obtains response information from a data structure based on the at least one keyword. The automated processing system then returns an interactive response to the user via instant messaging. When the interactive query message is not addressed to the automated processing system, the interactive query message is forwarded to a support group through a chat room system. The response to the user may be sent through the chat system and may also be posted to the user's email address if the number of lines exceeds more than predetermined limit (e.g., 10 lines).

With some embodiments, the chat room system supports a chat room to share information via text with a group of other users. However, a chat room may include technologies for file sharing, where files may represent images, video, audio, and multimedia formats.

Figure 1:
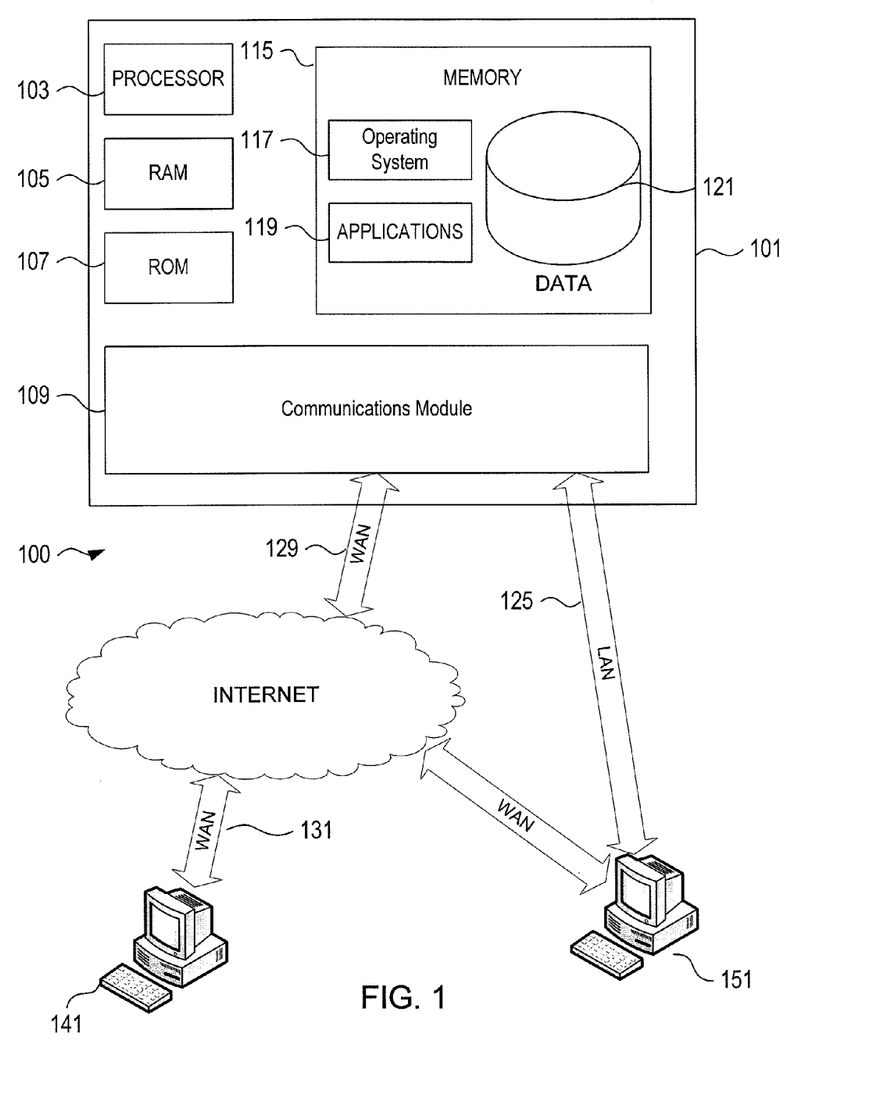
FIG. 1 shows an illustrative operating environment in which various aspects of the embodiments may be implemented.

FIG. 1 illustrates an example of a suitable computing system environment 100 (e.g., for supporting exemplary scenario 400 and process 300 with systems 500 and 600 (as shown in FIGS. 4, 3, 5, and 6, respectively) that may be used according to one or more illustrative embodiments. The computing system environment 100 is only one example of a suitable computing environment and is not intended to suggest any limitation as to the scope of use or functionality of the embodiments. The computing system environment 100 should not be interpreted as having any dependency or requirement relating to any one or combination of components shown in the illustrative computing system environment 100.

The embodiments are operational with numerous other general purpose or special purpose computing system environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, receipts, and the like to digital files.

Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown).

Database 121 may provide centralized storage of response information. Processor 103 may access the response information from database 121 and process the response information that may be included in an interactive response to a user. While database 121 is shown to be internal to computing device 101, database 121 may be external to computing device 101 with some embodiments.

Computing device 101 may operate in a networked environment supporting connections to one or more remote computing devices, such as branch terminals 141 and 151. The branch computing devices 141 and 151 may be personal computing devices or servers that include many or all of the elements described above relative to the computing device 101.

The network connections depicted in FIG. 1 include a local area network (LAN) 125 and a wide area network (WAN) 129, but may also include other networks. When used in a LAN networking environment, computing device 101 is connected to the LAN 825 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. The network connections may also provide connectivity to a CCTV or image/iris capturing device.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the invention may include forms of computer-readable media. Computer-readable media include any available media that can be accessed by a computing device

101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the embodiments is contemplated. For example, aspects of the method steps disclosed herein may be executed on a processor on a computing device 101. Such a processor may execute computer-executable instructions stored on a computer-readable medium.

Figure 2:
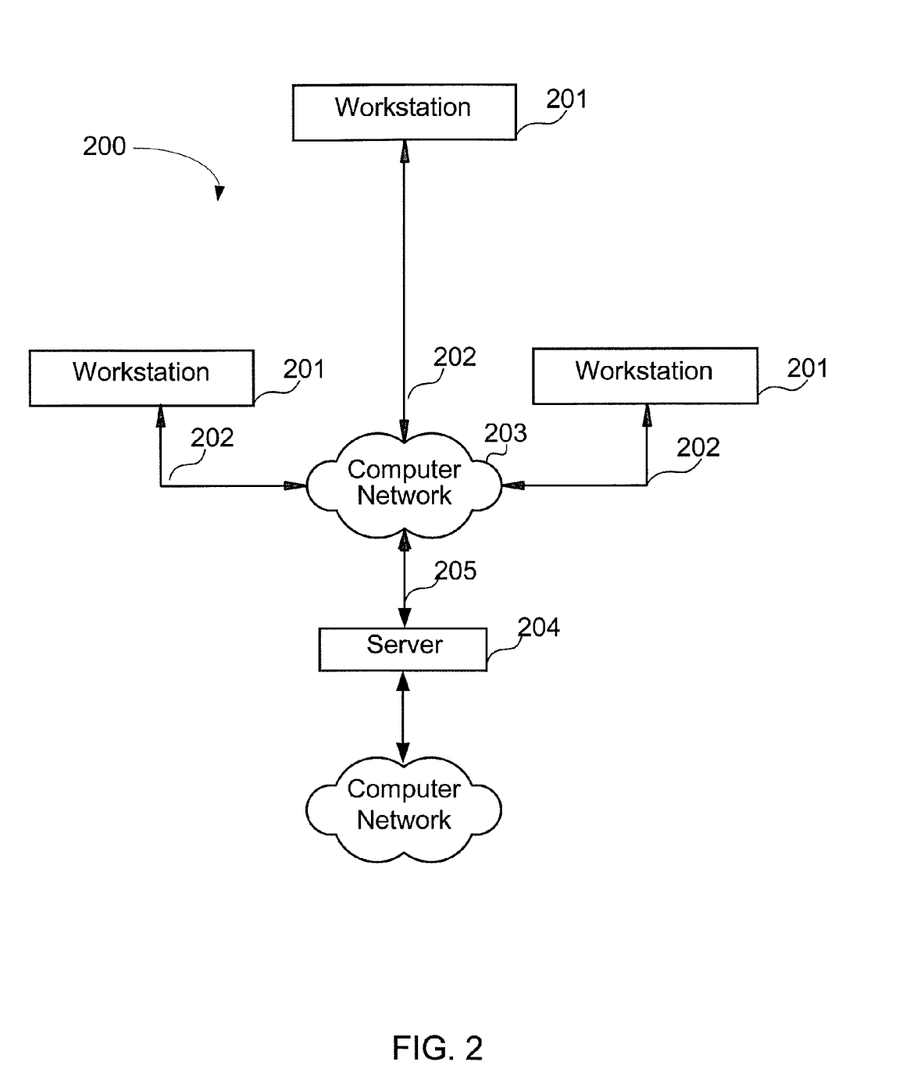
FIG. 2 is an illustrative block diagram of workstations and servers that may be used to implement the processes and functions of certain aspects of the embodiments.

Referring to FIG. 2, an illustrative system 200 for implementing methods according to some embodiments is shown. As illustrated, system 200 may include one or more workstations 201. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like. Connectivity may also be supported to a CCTV or image/iris capturing device.

With some embodiments, illustrative system 200 may support an interactive system as will be further discussed. For example, workstations 201 may function as user terminals and server 204 may function as a chat room system and/or automated processing system.

As understood by those skilled in the art, the steps that follow in the Figures may be implemented by one or more of the components in FIGS. 1 and 2 and/or other components, including other computing devices.

Aspects of the invention are directed to an automated solution with the ability for traders of financial securities and sales people to query a tool and obtain answers for frequently asked questions (FAQ's) and level 0 support based on interactive responses received from the business users. An automated processing system (that is referred as "Robot" in the following discussion) may be implemented with a shell script and may obtain response information and then instant message and/or e-mail the results to the requester without human interaction.

With an aspect of the invention, different capabilities are supported for applications in market trading, different areas of finance, human resources, transport, and information technology (IT). A user can log into chat room, where traders and sales persons are available. An automated processing system (referred as a Robot) interactively answers questions that are addressed to the Robot during the chat session. For example, the user may request that the Robot provide trade breakdown information (such a client name and trade volume) or to resolve a frequently asked question. The Robot may then send requested information to the user through instant messaging or e-mail. For example, if the response is not greater than ten lines, the Robot may use instant messaging; otherwise, the Robot may revert to e-mail. If the question is too complex and cannot be adequately answered by the Robot, the support team may be alerted so that a support team member can intervene in order to respond to the query request.

With an embodiment of the invention, a tool is built with the Java programming language and may be portable and can be customized to suit the needs of various projects. It may be built as part of chat software that is often used by the traders and sales people who may request information that is needed from a Robot without going through the support team.

Figure 3:
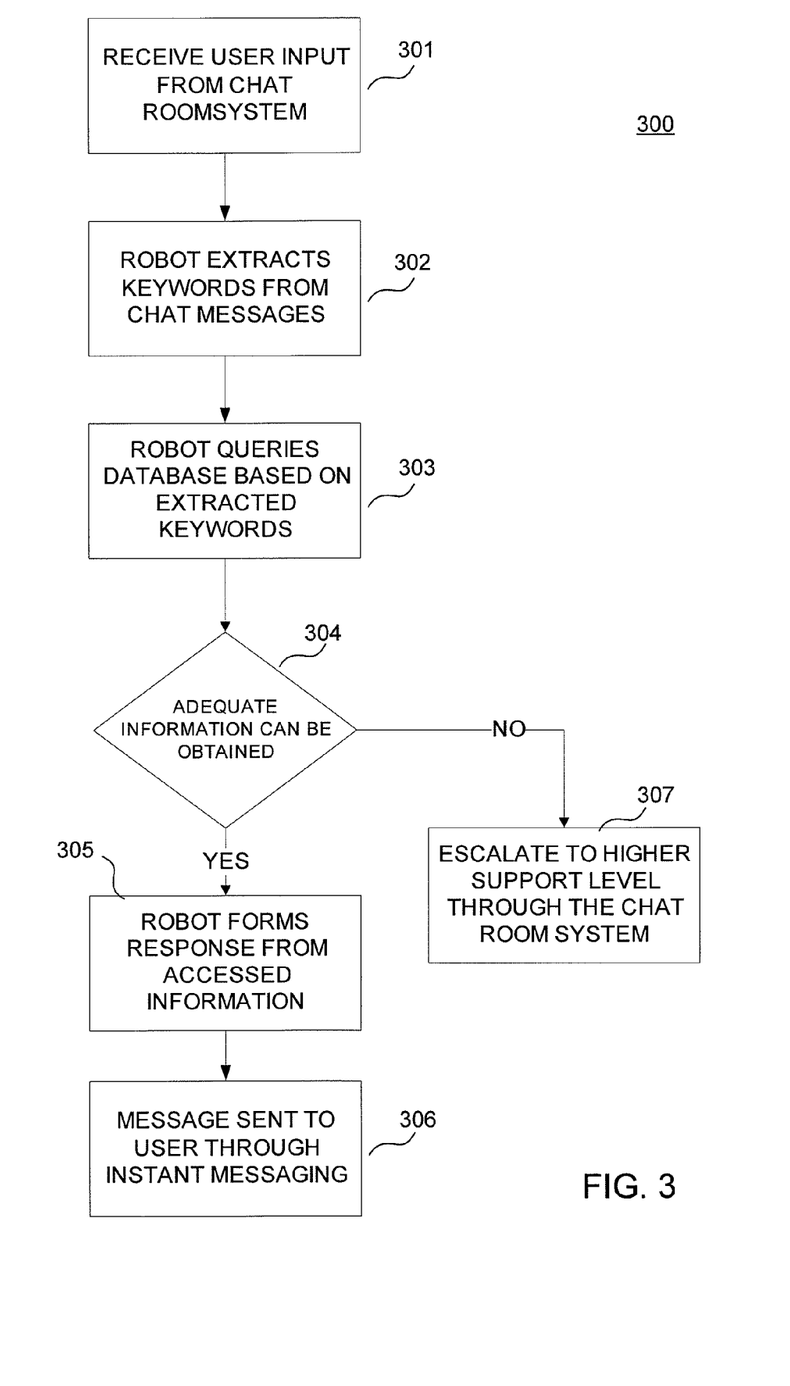
FIG. 3 shows a flow diagram for supporting an interactive session with a robot interactive system in accordance with various aspects of the embodiments.
Figure 5:
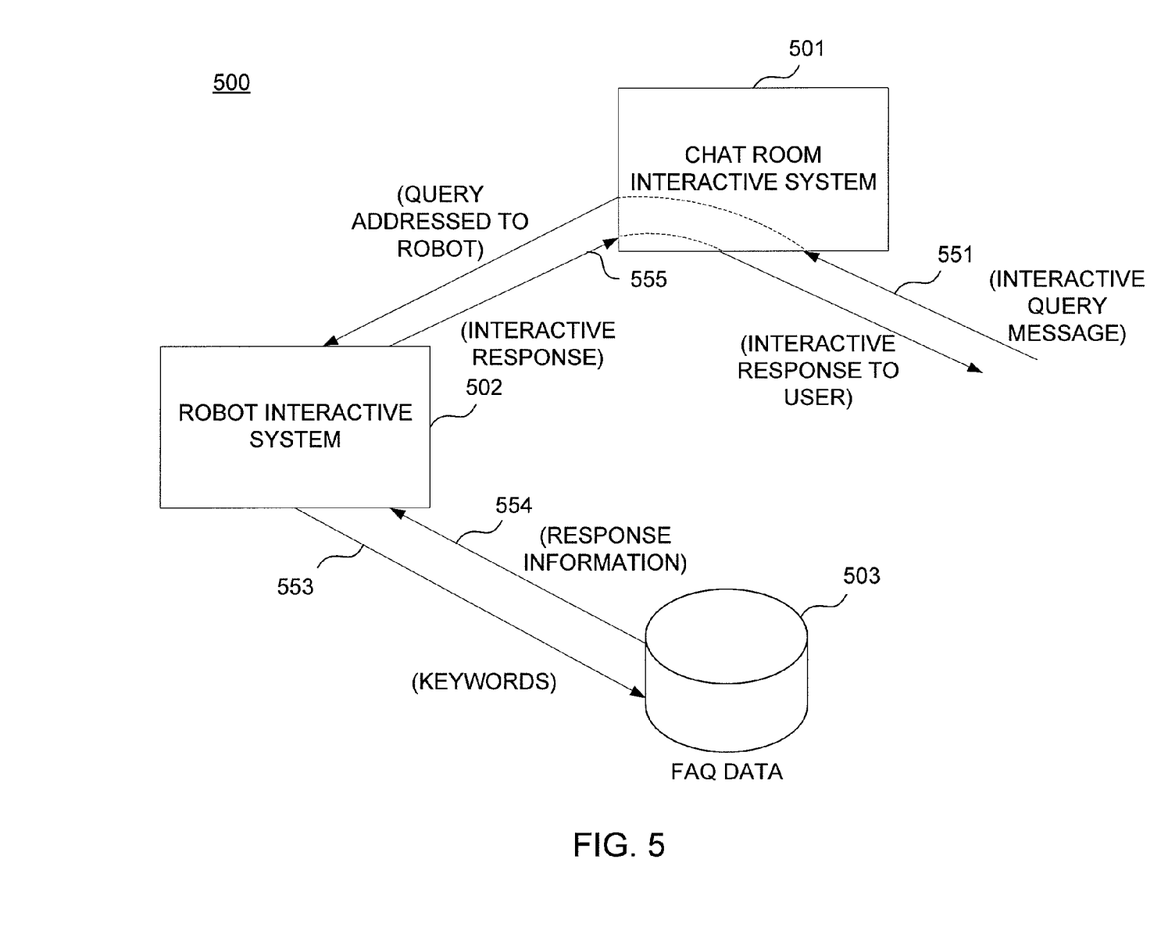
FIG. 5 shows a block diagram of an interactive system that responds to interactive query messages in accordance with various aspects of the embodiments.
Figure 6:
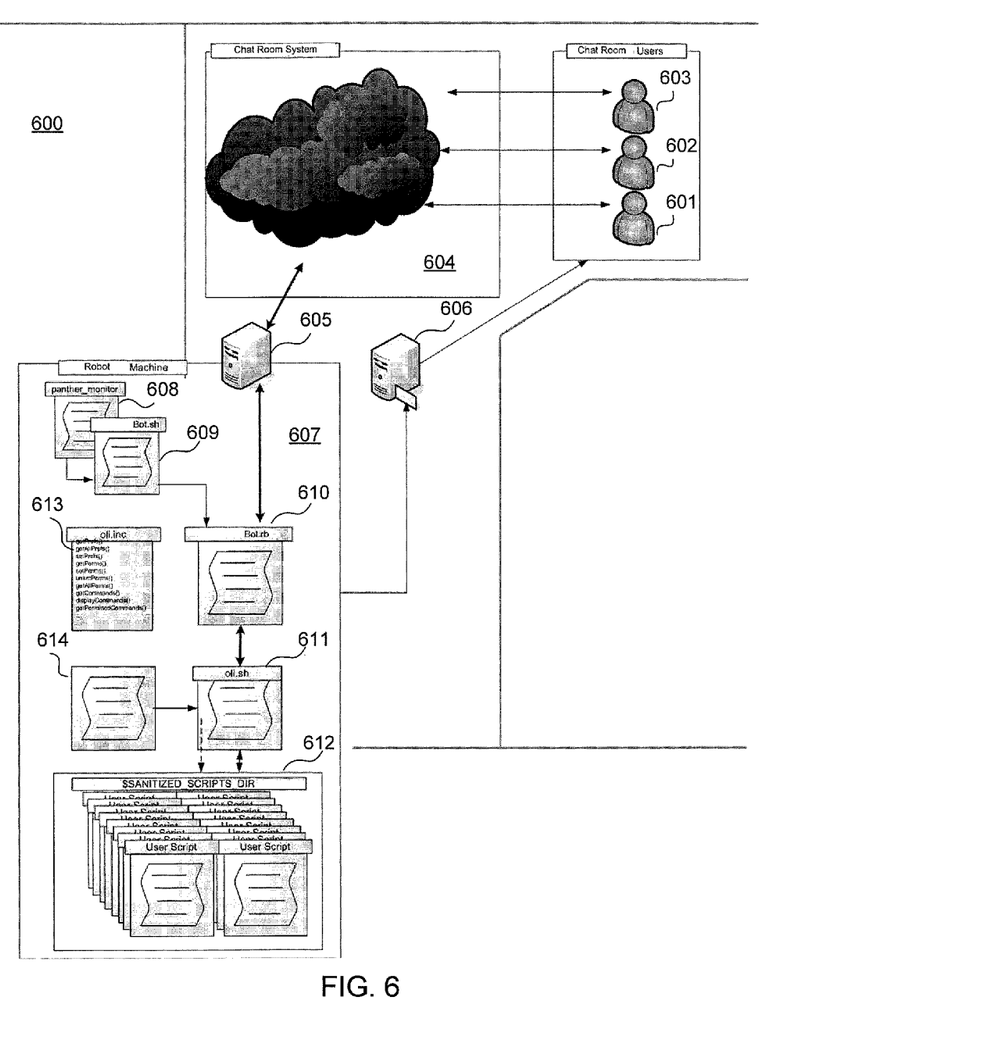
FIG. 6 shows an interactive system that responds to interactive query messages from users in accordance with various aspects of the embodiments.

FIG. 3 shows flow diagram 300 for supporting an interactive session with an automated processing system, which may be referred as a robot interactive system, in accordance with various aspects of the embodiments. In block 301 an interactive query message is received user through chat software, and an automated processing system (the "Robot" that may correspond to robot interactive system 502 as shown in FIG. 5 or robot machine 607 as shown in FIG. 6) extracts keywords from the chat message in block 302. For example, the Robot may parse the message to obtain a client name "XYZ" and command "trad stat". The Robot then may associate the client name and command and accordingly query a data structure (e.g., database 503 as shown in FIG. 5) based on the extracted keywords in block 303.

The Robot may support specialized commands, depending on the application. With market trading, for example, exemplary commands include: user statistics, trade statistics, user permissions, order statistics, user group and account information, and specialized statistics. Trade statistics may refer to trade volume for a particular client during a specified period of time. User statistics may refer to the groups that a user is subscribed to. User permissions may refer to user access to the type of activities and the associated client. For example, the user may be permitted to initiate stock options for client XYZ but not initiate foreign currency trades. Moreover, some embodiments may differentiate permission-based user roles with respect to trader, sales, administrator, and the like. Roles may restrict the level of data that a user is permitted to view and access. Also, automated messages may be sent across to a user when requesting data that the user is not permitted to view.

In addition, the Robot may support generic commands such as a help command to provide a list of support commands and an info command to provide information on the different types of available commands.

The Robot, based on the accessed information, then forms a response in block 305. A response message is then sent to the user through the chat room software or directly to the users through instant messaging in block 306. If adequate information cannot be accessed from the database, as determined by block 304, the Robot may escalate processing of the interactive query message to a higher support level so that a member of the support group can directly respond to the user input.

The exchange, as shown in FIG. 3, between the Robot and the user may be interactive in nature, in which the user sends a series of query messages and receives a response to each essentially in real time as if a member of the support group were actually engaged in the exchange.

Figure 4:
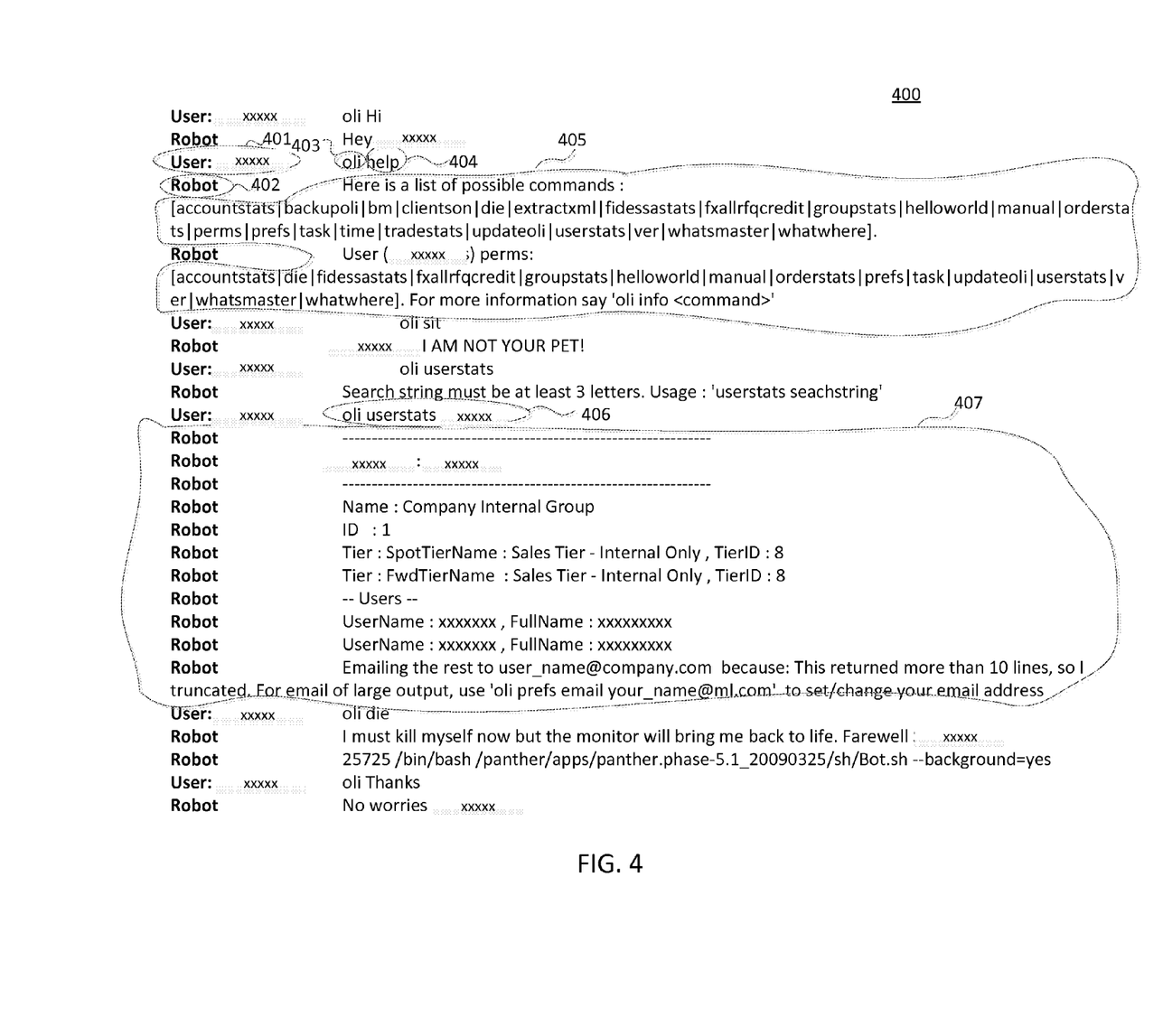
FIG. 4 shows an exemplary scenario between a user and a robot interactive system in accordance with various aspects of the embodiments.

FIG. 4 shows exemplary scenario 400 between user 401 and robot interactive system 402 (e.g., corresponding to robot interactive system 502 as shown in FIG. 5 or robot machine 607 as shown in FIG. 6) in accordance with various aspects of the embodiments. In exemplary scenario 400, the automated processing system (Robot) is addressed as "oli" by the user to provide a user-friendly environment for user 401.

In scenario 400, for example, the user may generate an interactive query message containing the addressed entity 403 ("oli") and the command type 404 ('help'). Automated processing system 402 replies by providing the list of available commands 405 to user 401. The following shows the relevant portion of the interactive exchange in FIG. 4.

User Srivatsan: oli help
Robot: Here is a list of possible commands:
[accountstats|backupoli|bm|clientson|die|extractxml|fidessastats|fxallrfqcredit|groupstats|helloworld|manual|orderstats|perms|prefs|task|time|tradestats|updateoli|users tats|ver|whatsmaster|whatwhere].
Robot: User (sjagann1's) perms:
[accountstats|die|fidessastats|fxallrfqcredit|groupstats|helloworld|manual|orderstats|prefs|task|updateoli|userstats|ver|whatsmaster|whatwhere]. For more information say 'oli info <command>'

According to some embodiments, when an interactive response is greater than a predetermined length, part of the response is sent in an instant message and the remaining portion that exceeds the predetermined length is sent in e-mail to the user. This aspect is shown when the automated processing system replies to interactive query message 406 ("oli user stats sjagann1") with interactive response 407.

With some embodiments, the level and type of information provided by the Robot may be customizable as per the user request and choice. There may be automated scripts that are built in and called by the Robot based on the user input and the information that is either provided immediately or mailed to the requester.

FIG. 5 shows block diagram of an interactive system 500 that responds to interactive query messages in accordance with various aspects of the embodiments. Interactive system 500 supports an automated solution that provides financial traders and sales people of a company access to query system 500 in order to obtain answers for frequently-asked questions and to provide level 0 support based on interactive responses received from the business users. System 500 may perform different kinds of report generation with respect to user profile information. Also, specific trade/order related information may be provided to the trader, and sales personnel may request trade volume for a high profile client between specified date ranges. System 500 performs a controlled method to allow client service and operations teams to query robot interactive system 502 about routine requests. Consequently, interactive system 500 relieves support staff from routine queries that may otherwise require a major portion of the support team resources.

Interactive system 500 may be built with the Java programming language, portable, and customizable to suit the needs of project requirements. Robot interactive system 502 is integrated with chat room interactive system 501, which utilizes chat software. With some embodiments, chat room interactive system 501 may incorporate commercially available chat software often used by financial traders and sales people. Consequently, users can request needed information from robot interactive system 502 without going through the support team.

As shown in FIG. 5, a user logs into a chat room through chat room interactive system 501 where support staff (e.g., traders and sales people) are available. When interactive query message 551 is addressed to robot interactive system 502, message 551 is forwarded by chat system 501 to robot system 502. Otherwise, message 551 may be sent to support staff for direct interaction with the user.

As previously discussed, robot interactive system 502 extracts one or more keywords 553 (e.g., user name, client name, and command type) to access response information 554 from database 503. Response information 554 may include answers to questions that are typically asked by more than one user. Response information 554 is then incorporated into interactive response 555 that may be sent to the user via instant messaging through chat system 501 or directly to the user. As previously discussed, if response 555 is larger than a predetermined size, it may be sent via e-mail and/or instant messaging.

When no information or insufficient response information is available from database 503, the query may be forwarded to the support team for resolution.

System 500 offers a number of beneficial attributes with respect to traditional systems. First, the effort for supporting lower level support may be reduced so that the support team can resolve issues that are unique and that require further investigation. When system 500 is able to respond to an interactive query, the response is typically faster and more consistent that if the support team were directly involved. An aspect of the embodiments helps other employees in a business generate the desired results that may include management reports/trade-related information without waiting for assistance from the support/development team if access for entering information in database 503 is available outside the support team. Moreover, the response may be formatted in a more refined manner and may be formatted in accordance with a user's preferences.

As will be further discussed, robot interactive system 500 includes script for automatically responding to users. With some embodiments, a user should have the permissions to run specific commands. Also, on-line help is provided for new entrants to provide information about supported commands. System 500 is typically user-friendly and easy to understand, while providing flexibility to the business to obtain just-in-time answers to business queries that are typically error free because the process is automated and does not involve manual intervention.

FIG. 6 shows interactive system 600 that responds to interactive query messages from users in accordance with various aspects of the embodiments. System 600 includes interactive chat system 604, which may incorporate commercially available software, and robot machine 607. Software scripts, which typically comprise computer-executable instructions, are executable by robot machine 607. Scripts are typically distinct from the core code of the application, which is usually written in a different language, and are often created or at least modified by the end-user. Scripts are often interpreted from source code or byte code, whereas the applications they control are traditionally compiled to native machine code. Scripting languages are typically embedded in the applications that they control.

Execution of computer-executable instructions is initialized when Bot.sh shell script (not explicitly shown) is started and stopped by core panther start/stop scripts (not explicitly shown). Bot.sh shell script 609 is monitored while executing by panther_monitor_local script 608. Bot.sh shell script 609 then launches Bot.rb script 610, which functions as a gateway between system 604 through computer 605 and oli.sh script 611, which may be contained in a memory device within system 607.

While executing, Bot.rb script 610 listens for messages from chat room users 601-603 that begin with "oli" followed by a string of characters of "0-9", "a-z", "A-Z", "_", and "-" characters. Matching messages are passed to oli.sh script 611 along with user's username, first name, and last name. Consequently, oil.sh script 611 interprets the string from chat room user 601, 602, or 603 as a command string and may use the functions and variables provided in oli.inc script 613. Valid commands for oli.sh script 611 include two built-in commands help and info (where corresponding script may be included in script 614) plus all of the scripts in $SANITZ-IED_SCRIPTS_DIR 612, which may be included in a data structure, e.g., database 503 as shown in FIG. 5. Robot machine 607 subsequently includes the response information from $SANITZIED_SCRIPTS_DIR 612 into an interactive response message that is sent via instant messaging through computer 605 and interactive chat system 604 to user 601, 602, or 603. If the interactive response is sufficiently large, at least a portion of the interactive response message is sent to user 601 602, or 603 through e-mail server 606. However, with some embodiments, the entire response message may be sent entirely via one communication mode (e.g., instant messaging or e-mail).

Robot machine 607 may also support user permissions and user preferences. Before oli.sh script 611 executes a received command, script 611 ensures that the user is permissioned. However, commands help and info is typically executable by all users. Also, robot machine 607 may store preferences store information about chat room users 601-603. For example, e-mail addresses may be important when oli.sh script 611 uses e-mail to send interactive response (e.g., longer than 10 lines).

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

We claim:

1. A computer-assisted method comprising:
   receiving a query message from a user device;
   when the query message is addressed to an automated processing entity through a chat room system, wherein the query message includes an address of the automated processing entity,
      passing the query message to the automated processing entity;
      extracting, by the automated processing entity, at least one keyword from the query message;
      obtaining response information from a data structure based on the at least one keyword;
      when a non-zero amount of available information accessed from the data structure is less than a predetermined amount based on the at least one keyword, redirecting the query message from the automated processing entity through the chat room system;
      returning the response to the user device, wherein the response includes at least one of user statistics, trade statistics for a client, user permissions for the user device, and user group and account information; and
      when the response exceeds a predetermined size, sending a first portion of the response to the user device through instant messaging and a second portion of the response to the user device through e-mail; and
   when the query message is not addressed to the automated processing entity through the chat room system,
      forwarding the query message to a support group entity through the chat room system.

2. The method of claim 1, further comprising:
   when the response information is not available from the data structure and the query message is addressed to the automated processing entity, forwarding the query message to the support group entity through the chat room system.

3. The method of claim 1, further comprising:
   determining, by the automated processing entity, whether the user device has user permission to receive the response information;
   when the user device has the user permission, including the response information in the response.

4. The method of claim 3, further comprising:
   when the user device does not have the user permission, not including the response information in the response.

5. The method of claim 1, further comprising:
   determining, by the automated processing entity, whether the query message is consistent with an expected format; and
   sending an indicator in the response, wherein the indicator is indicative that the query message is inconsistent.

6. The method of claim 1, further comprising:
   when the query message is addressed to a member of the support group entity, forwarding the query message to the member.

7. A non-transitory computer-readable storage medium storing computer-executable instructions that, when executed, cause a processor to perform:
   receiving a query message from a user device through a chat channel;
   when the query message is addressed to an automated processing entity through a chat room system, wherein the query message includes an address of the automated processing entity,
      forwarding the query message to the automated processing system;
      extracting a command type from the query message;
      obtaining response information from a data structure based on the command type;
      when a non-zero amount of available information accessed from the data structure is less than a predetermined amount based on at least one keyword, redirecting the query message from the automated processing entity through the chat room system;
      returning the response to the user device, wherein the response includes at least one of user statistics, trade statistics for a client, user permissions for the user device, and user group and account information; and
      when the response exceeds a predetermined size, sending a first portion of the response to the user device through instant messaging and a second portion of the response to the user device through e-mail; and
   when the query message is not addressed to the automated processing entity through the chat room system,
      forwarding the query message to a support group entity through the chat room system.

8. The non-transitory computer-readable medium of claim 7, wherein the computer-executable instructions, when executed, cause the processor to perform:

when the response information is not available from the data structure, forwarding the query message to the support group through the chat room system.

9. The non-transitory computer-readable medium of claim 7, wherein the computer-executable instructions, when executed, cause the processor to perform:
determining, by the automated processing system, whether the user device has user permission to receive the response information;
when the user device has the user permission, including the response information in the response.

10. A query-based apparatus comprising:
a memory device containing a data structure based on at least one keyword;
an electronic chat room apparatus configured to perform:
receiving a query message from a user device;
when the query message is addressed to an automated processing apparatus through the electronic chat room apparatus, wherein the query message includes an address of the automated processing apparatus, passing the query message to the automated processing apparatus; and
when the query message is not addressed to the automated processing apparatus, forwarding the query message to a support group entity through a chat session; and
the automated processing apparatus configured to perform:
extracting at least one keyword from the query message;
obtaining response information from the memory device;
when a non-zero an amount of available information accessed from the data structure is less than a predetermined amount based on the at least one keyword, redirecting the query message from the automated processing entity through the electronic chat room apparatus;
returning the response with the response information to the user device, wherein the response includes at least one of user statistics, trade statistics for a client, user permissions for the user device, and user group and account information; and
when the response exceeds a predetermined size, sending a first portion of the response to the user device through instant messaging and a second portion of the response to the user device through e-mail.

11. The query-based apparatus of claim 10, the automated processing apparatus forwarding the query message to the support group through the chat room apparatus when the response information is not available from the data structure.

12. The query-based apparatus of claim 10, the automated processing apparatus sending at least a portion of the response to the user device via e-mail when the response exceeds a predetermined size.

13. The query-based apparatus of claim 10, the automated processing apparatus determining whether the user device has user permission to receive the response information and including the response information in the response when the user device has the user permission.

* * * * *